(12) United States Patent
Pretty et al.

(10) Patent No.: US 11,077,956 B2
(45) Date of Patent: Aug. 3, 2021

(54) PRESSURE RELIEF ASSEMBLY

(71) Applicant: ROHR, INC., Chula Vista, CA (US)

(72) Inventors: Michael Sean Pretty, Jamul, CA (US); Walter J. Heim, San Diego, CA (US)

(73) Assignee: Rohr, Inc, Chula Vista, CA (US)

( * ) Notice: Subject to any disclaimer, the term of this patent is extended or adjusted under 35 U.S.C. 154(b) by 0 days.

(21) Appl. No.: 16/255,189

(22) Filed: Jan. 23, 2019

(65) Prior Publication Data
US 2020/0140105 A1 May 7, 2020

Related U.S. Application Data

(60) Provisional application No. 62/757,024, filed on Nov. 7, 2018.

(51) Int. Cl.
*B64D 29/06* (2006.01)
*F02K 1/72* (2006.01)
*B64F 5/10* (2017.01)

(52) U.S. Cl.
CPC .............. *B64D 29/06* (2013.01); *B64F 5/10* (2017.01); *F02K 1/72* (2013.01)

(58) Field of Classification Search
CPC ........... B64D 29/06; B64D 29/08; F02K 1/72; F02K 1/80; F02K 1/82; F05D 2260/605; F05D 2260/608; F01D 25/14
See application file for complete search history.

(56) References Cited

U.S. PATENT DOCUMENTS

| | | | |
|---|---|---|---|
| 4,825,644 A * | 5/1989 | Bubello | B64D 29/00 60/200.1 |
| 5,623,820 A * | 4/1997 | Balzer | B64D 29/02 60/39.091 |
| 5,765,883 A | 6/1998 | Dessenberger et al. | |
| 8,657,234 B2 | 2/2014 | Guillaume et al. | |
| 8,740,147 B2 | 6/2014 | Defrance et al. | |
| 2011/0240137 A1 | 10/2011 | Vauchel | |
| 2011/0297787 A1* | 12/2011 | Guillaume | B64D 29/06 244/129.4 |
| 2016/0047274 A1* | 2/2016 | Woolworth | F02C 7/18 415/146 |
| 2017/0089124 A1 | 3/2017 | Do | |

FOREIGN PATENT DOCUMENTS

| | | |
|---|---|---|
| EP | 2987985 | 2/2016 |
| EP | 3115562 | 1/2017 |
| FR | 2920135 | 2/2009 |

OTHER PUBLICATIONS

European Patent Office, European Search Report dated Mar. 23, 2020 in Application No. 19207801.2.
European Patent Office, European Office Action dated Mar. 25, 2021 in Application No. 19207801.2.

* cited by examiner

*Primary Examiner* — Andrew H Nguyen
(74) *Attorney, Agent, or Firm* — Snell & Wilmer L.L.P.

(57) ABSTRACT

A thrust reverser of a nacelle may include a translating sleeve and an inner fixed structure a pressure relief assembly. A pressure relief mechanism may include a pressure relief door coupled via a hinge and a latch to the inner fixed structure. Alternatively, a pressure relief door may be coupled to a frame via a hinge and a latch to the inner fixed structure. The pressure relief assembly may limit deflections between the thrust reverser and the pylon in response to a burst duct. The pressure relief door may release from the latch automatically in response to an over pressurization event.

5 Claims, 11 Drawing Sheets

PRESSURE RELIEF ASSEMBLY

CROSS REFERENCE TO RELATED APPLICATIONS

This application claims priority to and the benefit of, provisional patent application No. 62/757,024, filed on Nov. 7, 2018 and entitled "PRESSURE RELIEF ASSEMBLY," which is incorporated by reference herein in its entirety.

FIELD

The disclosure generally relates to turbofan propulsion systems for an aircraft. More particularly, the disclosure relates to pressure relief for a nacelle for a turbofan propulsion system.

BACKGROUND

Modern aircraft may utilize one or more turbofan propulsion systems powered by a gas turbine engine. The propulsion system may include a nacelle, which is a system of components that house the engine and its ancillary systems, and help form aerodynamic surfaces for flight, including a fan bypass air duct. Often, the nacelle includes a thrust reverser. The thrust reverser includes an inner fixed structure ("IFS") surrounding the engine which forms part of the interior surface of the bypass air duct through the thrust reverser. The volume between the IFS and the engine core defines the core compartment. In the core compartment, there are high pressure, high temperature pneumatic ducts that can fail, which would lead to catastrophic failure of the IFS structure. In order to relieve this rapid pressurization, pressure relief doors are provided that limit the pressure in the compartment to acceptable levels until the engine is shut down. Similar conditions can be found in other compartments where high pressure pneumatic ducts are present.

SUMMARY

An aircraft nacelle is disclosed. The nacelle may comprise an inner fixed structure and a pressure relief assembly. The pressure relief assembly may comprise a latch mechanism and a pressure relief door. The latch mechanism may comprise a pressure relief latch and be coupled to the inner fixed structure. The pressure relief door may comprise a bracket. The pressure relief latch may be configured to hold the pressure relief door in a fixed position.

In various embodiments, the pressure relief latch may be configured to automatically release radially outward in response to an increase in pressure on the pressure relief door. The pressure relief door may comprise a hinge coupled to the inner fixed structure. The pressure relief mechanism may be located on the bottom portion of the inner fixed structure. The thrust reverser may comprise a translating sleeve. The pressure relief mechanism may be located aft of the translating sleeve. The latch mechanism may have a latch mechanism weight. The bracket may have a bracket weight. The bracket weight may be less than the latch mechanism weight. The inner fixed structure may be configured to be mounted to a thrust reverser of the nacelle.

A method of manufacturing a pressure relief arrangement is disclosed. The method may comprise fastening a latch mechanism to a frame. The frame may comprise an aperture configured to receive a pressure relief door. The aperture may have a first side and a second side opposite the first side. The latch mechanism may be fastened to the frame at the first side. The method may further comprise coupling a non-biased hinge to the frame at the second side of the aperture. The method may further comprise coupling the pressure relief door to the non-biased hinge. The pressure relief door may comprise a bracket opposite the non-biased hinge. The method may further comprise engaging the bracket with the latch mechanism to hold the pressure relief door in a fixed position.

A method may further comprise installing the pressure relief arrangement on an inner fixed structure of a nacelle. Installing the pressure relief arrangement may be done at an engine bottom location on the inner fixed structure of the nacelle. Installing the pressure relief arrangement may be done at a location aft of a translating sleeve on the inner fixed structure of the nacelle. The bracket and latch mechanism may be configured to automatically release in response to an increase in pressure on the pressure relief door. The pressure relief door may be configured to hang down upon use providing an indication of use upon an aircraft landing.

A pressure relief arrangement is disclosed. The pressure relief arrangement may comprise a frame, a latch mechanism, and a pressure relief door. The latch mechanism may comprise a pressure relief latch coupled to the frame. The pressure relief door may be coupled to the frame via a hinge. The pressure relief door may comprise a bracket configured to engage the pressure relief latch. The bracket may also hold the pressure relief door in a fixed position relative to the frame.

In various embodiments, the frame may comprise mounting apertures configured to mount the frame to a thrust reverser. The pressure relief door and the frame may be separated by a gap at a position opposite the hinge. The bracket may have a bracket weight. The latch mechanism may have a latch mechanism weight. The bracket weight may be less than the latch mechanism weight. The pressure relief door and the pressure relief latch may be configured to disengage the bracket and release in the same direction in response to increase in the pressure on the pressure relief door. The frame may be configured to be welded to an inner fixed structure of a nacelle.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems for limiting deflections and stress in a nacelle with latches are disclosed below in accordance with various embodiments. During flight, an engine duct may burst causing an increase in pressure inside a core compartment surrounding the engine, or other conditions might exist which create a higher pressure inside of the core compartment than outside, resulting in a net force radially outward against the thrust reverser. Also, conditions might exist where a forward portion of the thrust reverser deflects outboard and begins to scoop the high velocity fan air stream in the bypass air duct, which can result in pressures and/or forces difficult to control that challenge the continued integrity of the thrust reverser structure. Pressure relief doors may be employed to prevent deflections of the thrust reverser structures. Proposed herein are pressure relief solutions which unlatch automatically to provide pressure relief when it is needed to tend to prevent deflections of the thrust reverser structure and may provide an indication to grounds crews that an issue occurred during flight.

Figure 1:
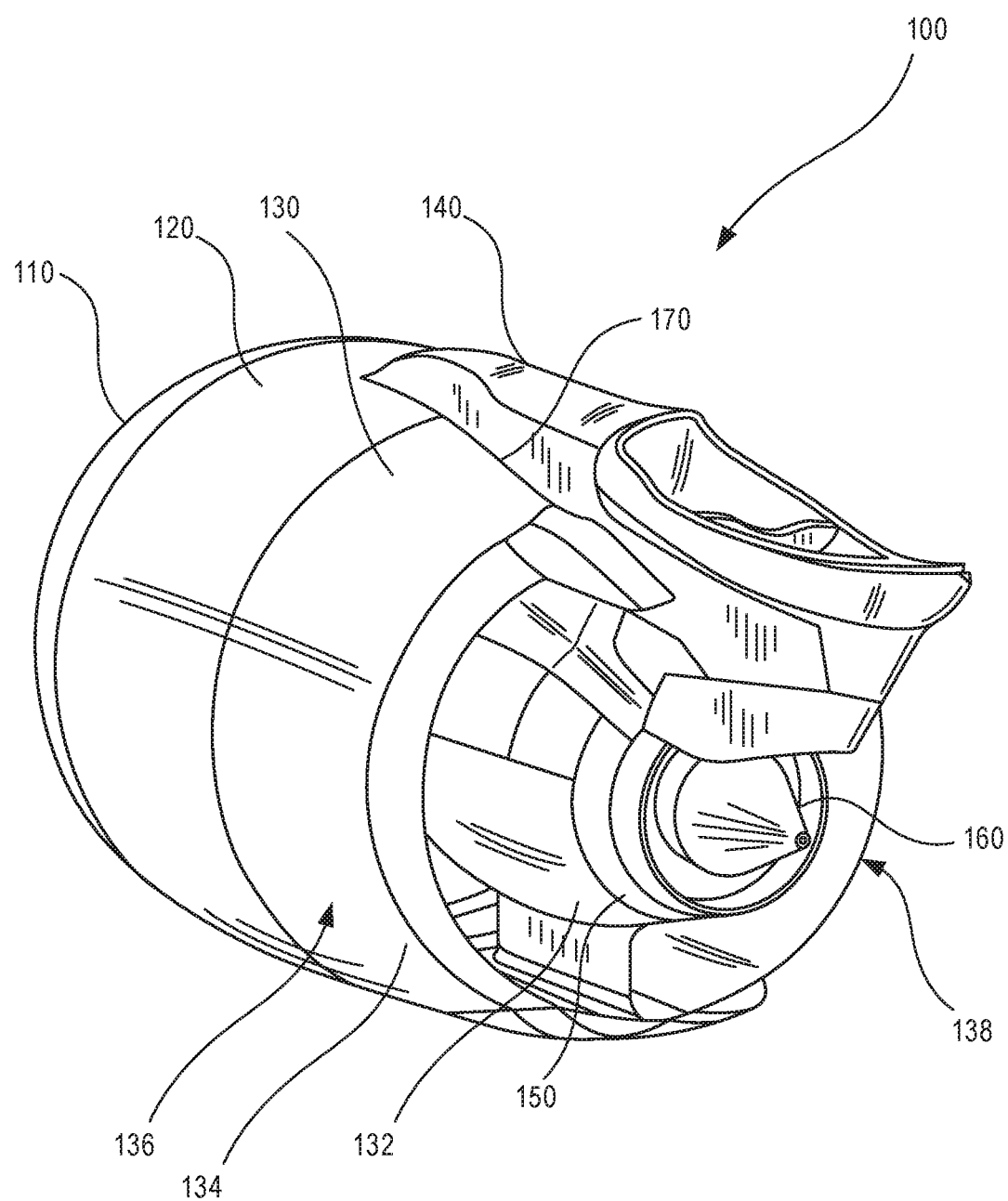
FIG. 1 illustrates a perspective view of a nacelle in accordance with various embodiments of the disclosure.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Thrust reverser 130 may comprise an inner fixed structure ("IFS") 132 and a translating sleeve 134. Bypass air from an engine fan may flow in a generally annular bypass air duct defined between the IFS 132 and the translating sleeve 134. The IFS 132 may be formed together with or be coupled to at its aft end a core cowl 150, which in turn is adjacent to a nozzle 160 for core engine exhaust air. The thrust reverser 130 may further be split into a left half 136 and a right half 138, such that there is, for example, a left half and a right half of IFS 132. The left half 136 and the right half 138 may be hinged to the pylon 140 at hinges 170. The left half 136 and the right half 138 may hinge open at hinges 170 in order to provide access to the engine for inspection or servicing. The left and right halves of the IFS 132 may together help form a core compartment around the engine when the left and right halves 136, 138 of the thrust reverser are closed.

Figure 2:
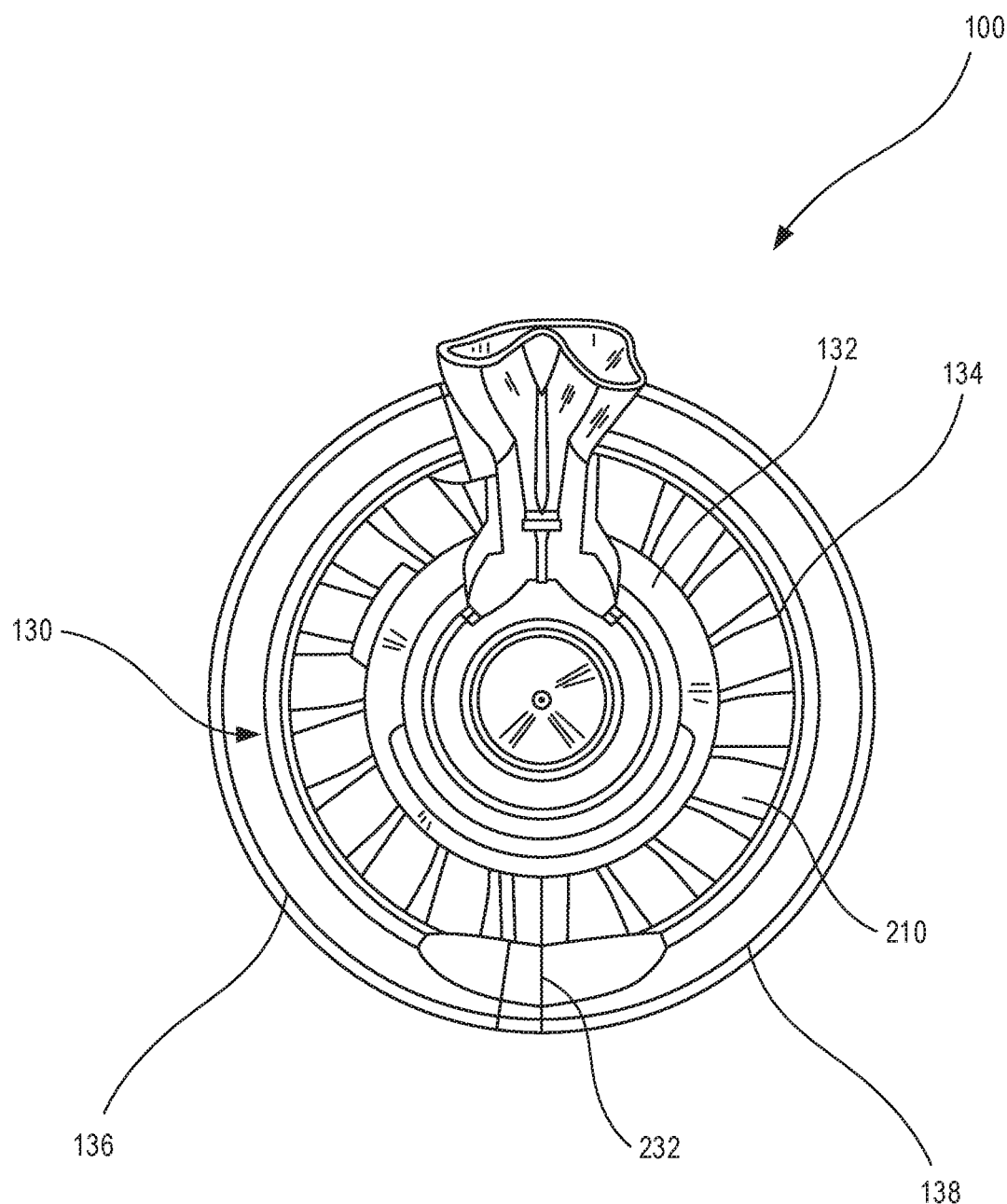
FIG. 2 illustrates an aft view of a nacelle in a closed position in accordance with various embodiments of the disclosure.

Referring to FIG. 2, an aft view of nacelle 100 in a closed position is illustrated according to various embodiments. Left half 136 and right half 138 of thrust reverser 130 may be split along split line 232. Engine fan 210 is visible through the bypass air duct between IFS 132 and translating sleeve 134.

Figure 3:
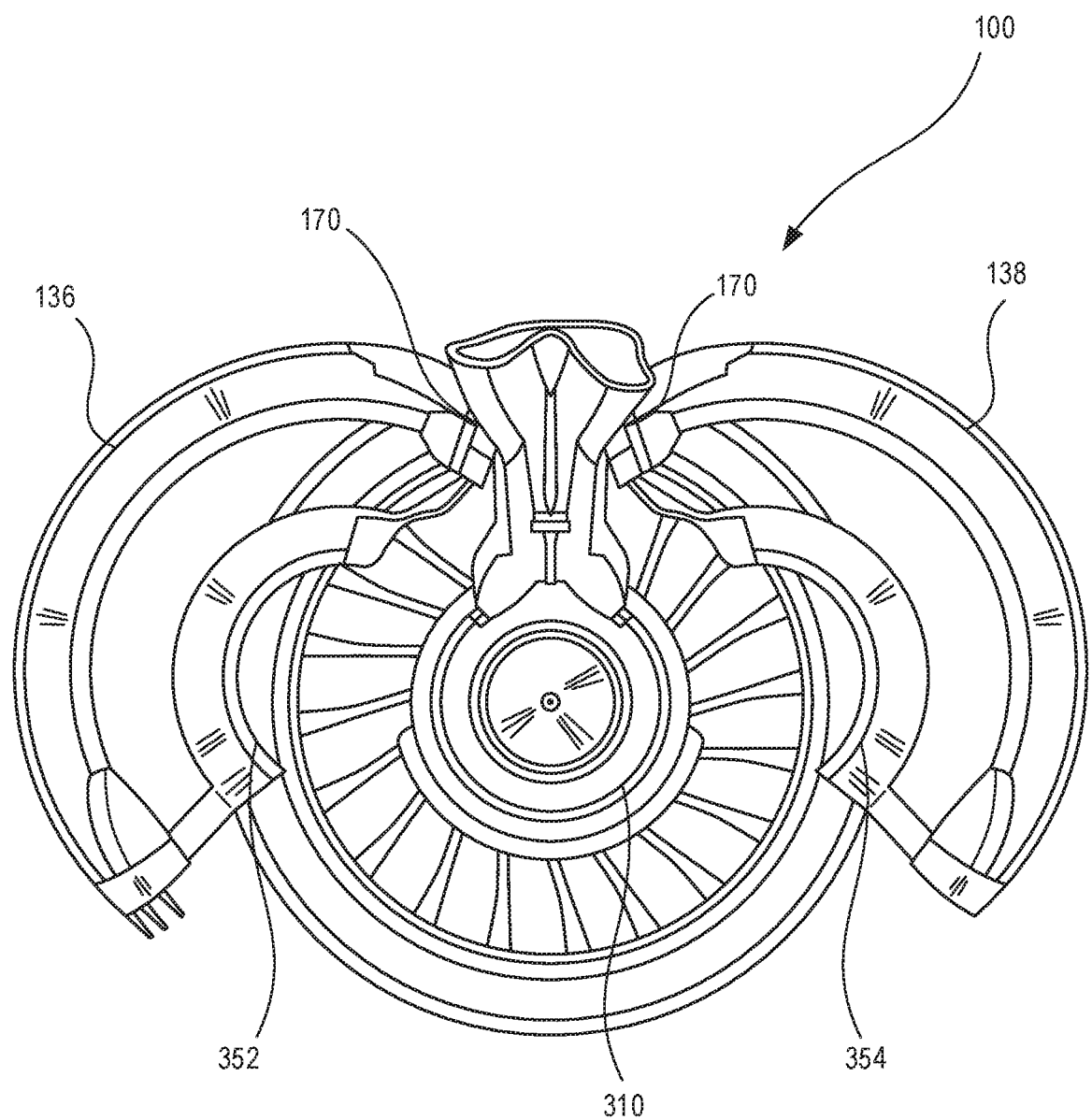
FIG. 3 illustrates an aft view of a nacelle in an open position in accordance with various embodiments of the disclosure.

Referring to FIG. 3, an aft view of nacelle 100 with the thrust reverser halves 136, 138 hinged open is illustrated according to various embodiments. Thrust reverser halves 136, 138 and core cowl halves 352, 354 are hinged open at hinges 170 in order to provide access to engine 310.

Figure 4:
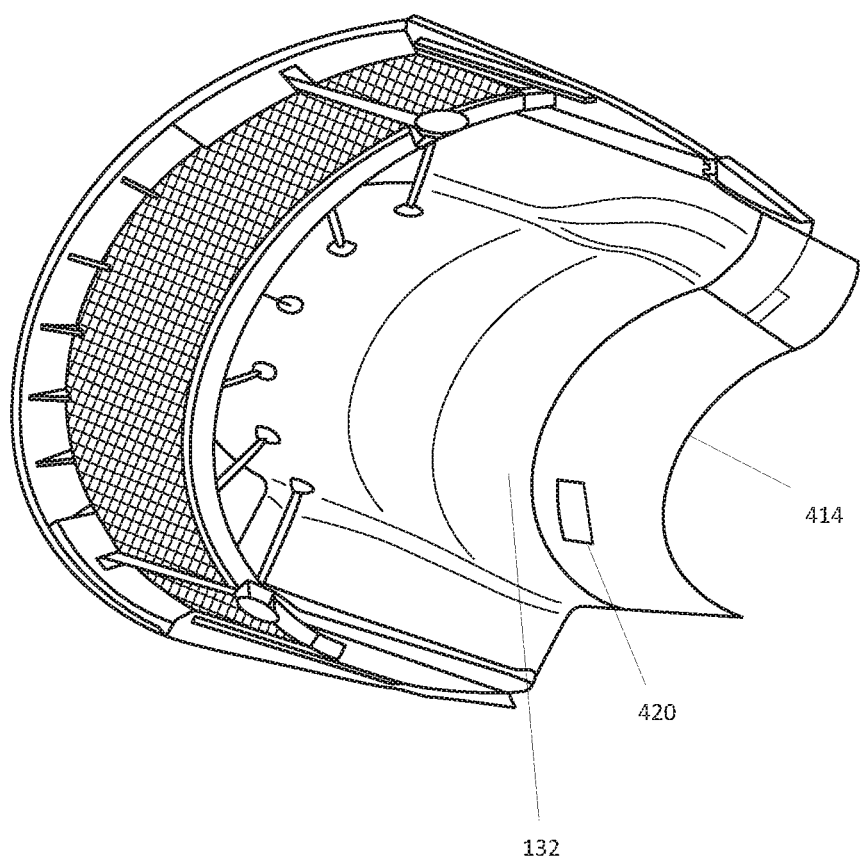
FIG. 4 illustrates a perspective view of a thrust reverser having a pressure relief assembly in accordance with various embodiments of the disclosure.

Referring to FIG. 4, a perspective view of a thrust reverser having a pressure relief assembly 420 is illustrated according to various embodiments. For ease of reference, the translating sleeve of the thrust reverser is removed in the illustration. The pressure relief assembly 420 may be coupled to the IFS 132. The pressure relief assembly 420 may be located on the aft portion 414 of the IFS 132 to allow the pressurized fluid that builds up in a high pressure scenario, e.g., to prevent a burst duct scenario, to vent directly to ambient air. The thrust reverser may comprise a translating sleeve forming the outer wall of the fan duct. The annular surface between the trailing edge of the translating sleeve and the inner fixed structure is the fan exit plane. The pressure relief mechanism may be located aft of the fan exit plane.

Figure 5:
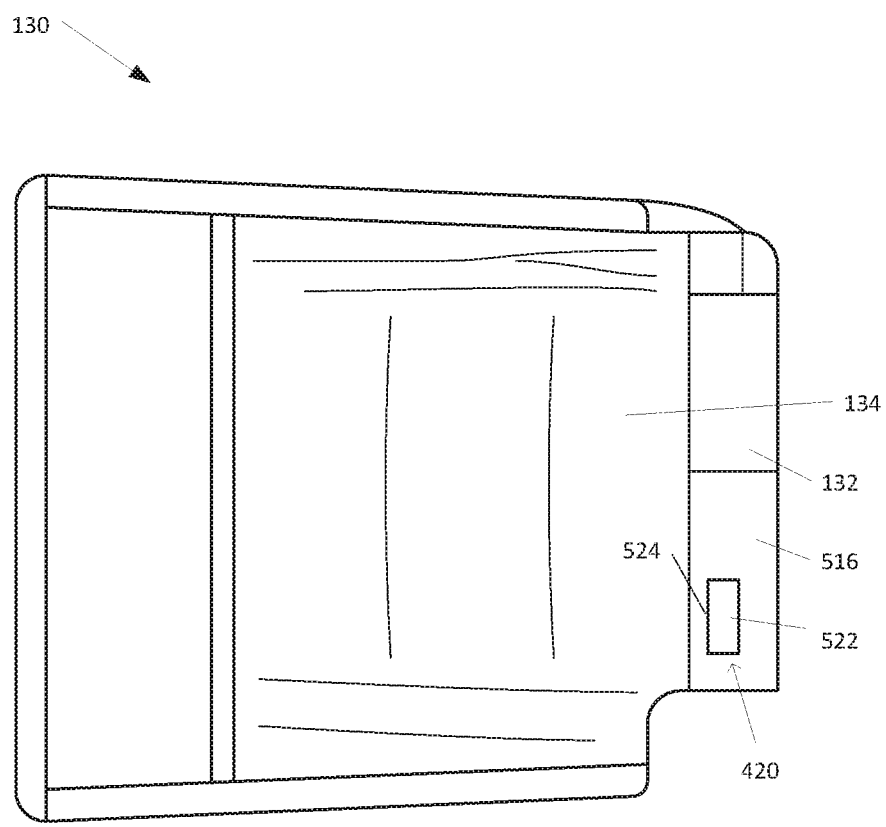
FIG. 5 illustrates a side view of a thrust reverser having a pressure relief assembly in accordance with various embodiments of the disclosure.

Referring to FIG. 5, a side view of a thrust reverser 130 having a pressure relief assembly 420 is illustrated according to various embodiments. The thrust reverser may comprise a translating sleeve 134 forming the outer wall of the fan duct, an IFS 132, and a pressure relief assembly 420. The annular surface between the trailing edge of the translating sleeve and the inner fixed structure is the fan exit plane. The pressure relief assembly 420 may be located aft of the fan exit plane. The pressure relief assembly 420 may be located anywhere radially on a nacelle. In an example embodiment, the pressure relief assembly may be located on an engine bottom portion 516 of the IFS 132 to allow the pressure relief assembly to release a greater volume of fluid in a high pressure scenario, e.g., prior to a burst duct scenario. The engine bottom portion 516 is the bottom half of the thrust reverser 130. This will ensure that upon use, the pressure relief assembly 420 will open to ambient air. Additionally, when the pressure relief assembly is on the engine bottom portion 516 of the IFS 132, the pressure relief assembly 420 may open after an event, which would provide an indication that an event occurred based on visual inspection after an aircraft lands. Further, the pressure relief assembly 420 may comprise a pressure relief door 522 and a relief hinge 524, about which the pressure relief door 522 opens when the pressure relief assembly 420 is in use. The relief hinge 524 may be located at the forward edge of the pressure relief door 522 in order to ensure the pressure relief door 522 remains open after use. The relief hinge 524 may couple the pressure relief door 522 to the IFS 132 of the thrust reverser 130.

Figures 6A, 6B:
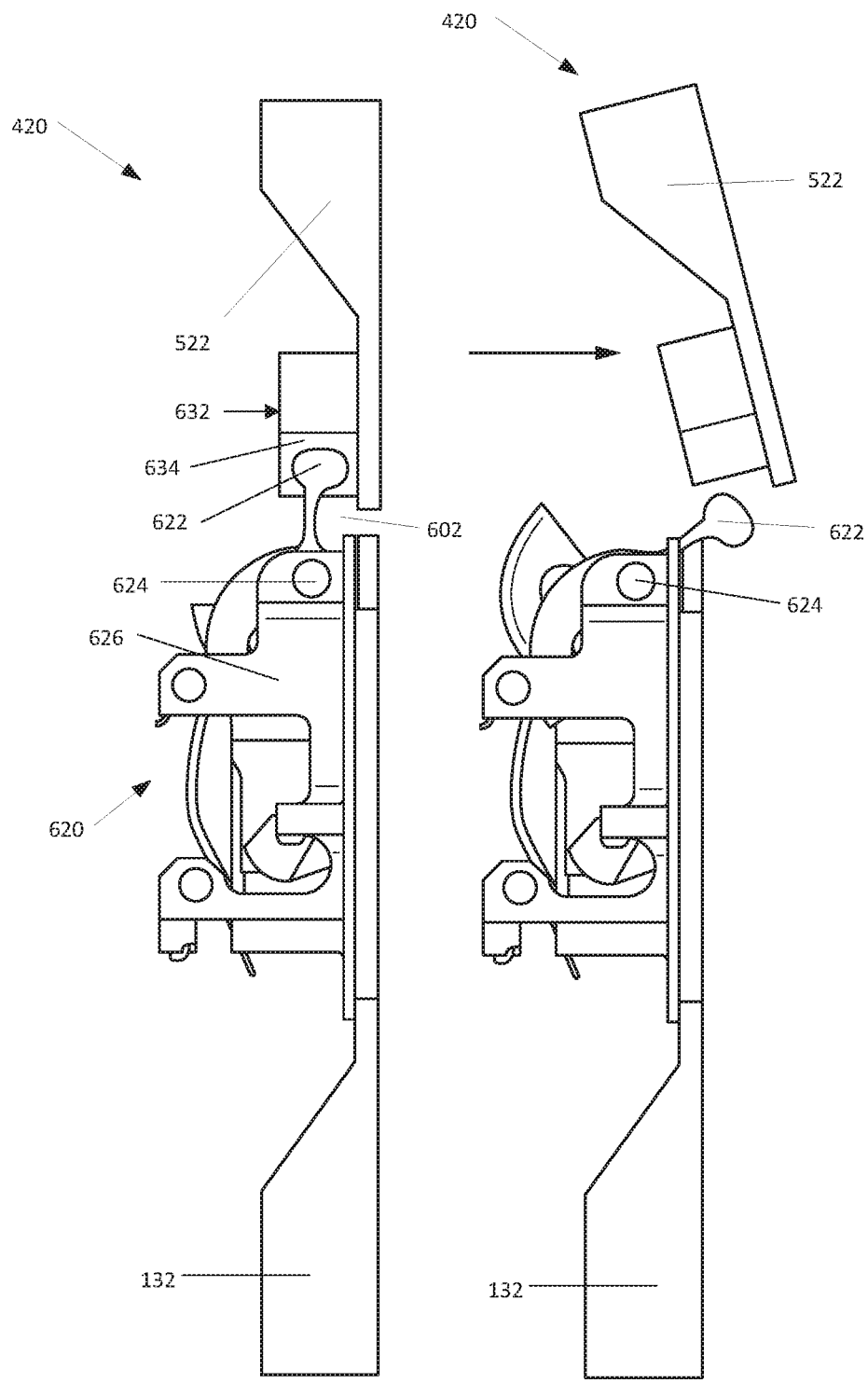
FIG. 6A illustrates a pressure relief assembly in accordance with various embodiments.
FIG. 6B illustrates a pressure relief assembly in accordance with various embodiments.

Referring to FIG. 6A, a pressure relief assembly 420 is illustrated according to various embodiments. The pressure relief assembly 420 may comprise a latch mechanism 620 coupled to an IFS 132 of a thrust reverser, and a pressure relief door 522 comprising a bracket 632. The latch mechanism 620 may comprise a latch housing 626, a pressure relief latch 622, and a fulcrum 624 about which the pressure relief latch 622 pivots. The latch mechanism 620 may be coupled to the pressure relief door 522 by engaging the pressure relief latch 622 to the bracket 632, fixing the pressure relief door 522 in place. The bracket 632 may comprise a keeper 634 designed to fix the pressure relief latch 622 in place during normal operation. The pressure relief door 522 may be coupled to the IFS 132 at a hinge located opposite the bracket 632, as shown in FIG. 5. The pressure relief door 522 and the IFS 132 may be separated by a gap 602, where the latch mechanism 620 couples the IFS 132 to the pressure relief door 522. In various embodiments, the gap 602 may be sealed during normal operation. Since the latch mechanism comprises several components, whereas the bracket may simply comprise attachment features and a keeper, the latch mechanism may be significantly heavier compared to the bracket. Thus, by placing the bracket 632 on the pressure relief door 522, as opposed to placing the latch mechanism 620 on the pressure relief door 522, the mass moment of inertia of the pressure relief door 522 may be significantly reduced. This configuration results in a pressure relief door 630 that is able to open more rapidly, relieving pressure faster, resulting in limited peak pressure during the burst duct event.

Referring to FIG. 6B, a pressure relief assembly 420 is illustrated in an open position. An open position occurs when a pressure differential across the pressure relief door 630 reaches or exceeds a predetermined pressure threshold. The latch mechanism 620 may be configured to automatically release the pressure relief latch 622 once the pressure on the pressure relief door 522 reaches the predetermined pressure threshold (trigger pressure). When in use, the pressure relief latch 622 may pivot about the fulcrum 624 of the latch mechanism 620. The pressure relief latch 622 may release outward of the IFS 132 of the thrust reverser and into ambient air. In an example embodiment, the pressure relief 630 door may release automatically when the pressure reaches a defined pressure range. In an example embodiment the defined pressure range may be 2-3.5 psid (13.79-24.13 kPa), depending on the design. In another example embodiment, the defined pressure range may be 2-5 psid (13.79-34.47). Once the pressure relief latch 622 releases the pressure relief door 630, it will swing outboard relieving the pressure buildup in the compartment. The compartment pressure may peak as the pressure relief door rotates outboard, but it may stabilize to a steady state pressure when the door reaches an equilibrium position.

Figure 7:
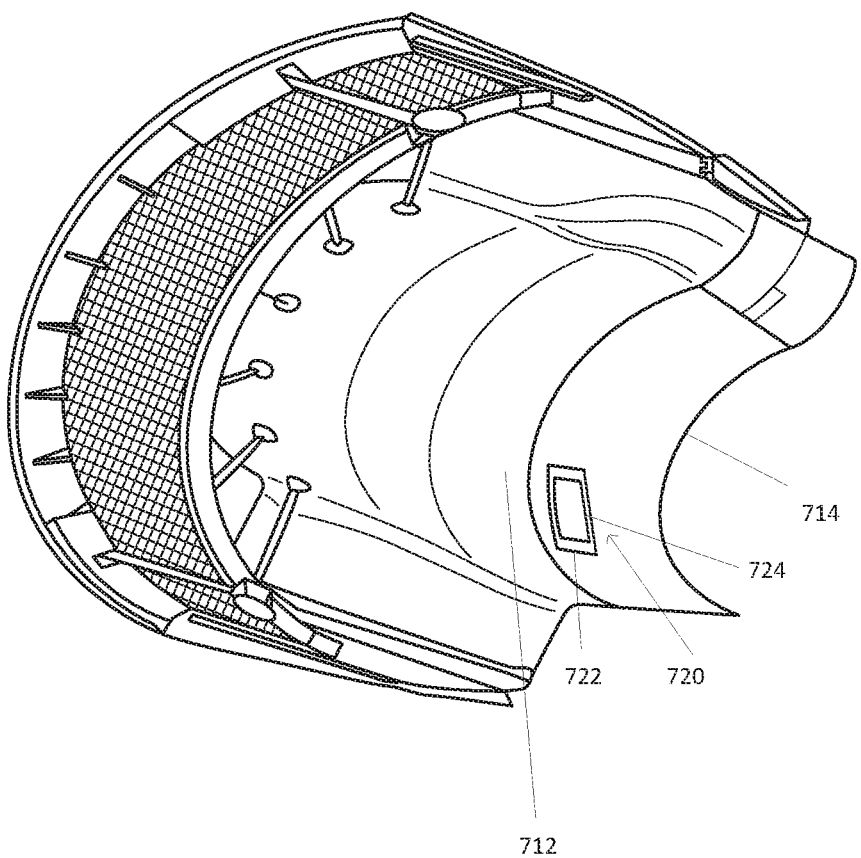
FIG. 7 illustrates a perspective view of a thrust reverser having a pressure relief arrangement in accordance with various embodiments of the disclosure.

Referring to FIG. 7, a perspective view of a thrust reverser having a pressure relief arrangement 720 is illustrated according to various embodiments. For ease of reference, the translating sleeve of the thrust reverser is removed in the illustration. The pressure relief arrangement 720 may be coupled to the IFS 712. The pressure relief arrangement 720 may be located on the aft portion 714 of the IFS 712 to allow the pressurized fluid that builds up in a high pressure scenario, e.g., a burst duct scenario, to vent directly to ambient air. The pressure relief arrangement 720 may comprise a frame 722 and a pressure relief door 724. The frame 722 may be coupled to the IFS 132 by welding, soldering or brazing the edges of the frame 722 to the IFS 132. Alternatively, the frame 722 may be coupled to the IFS 712 by standard fasteners, or any other mechanical fastening method known in the art.

Figure 8:
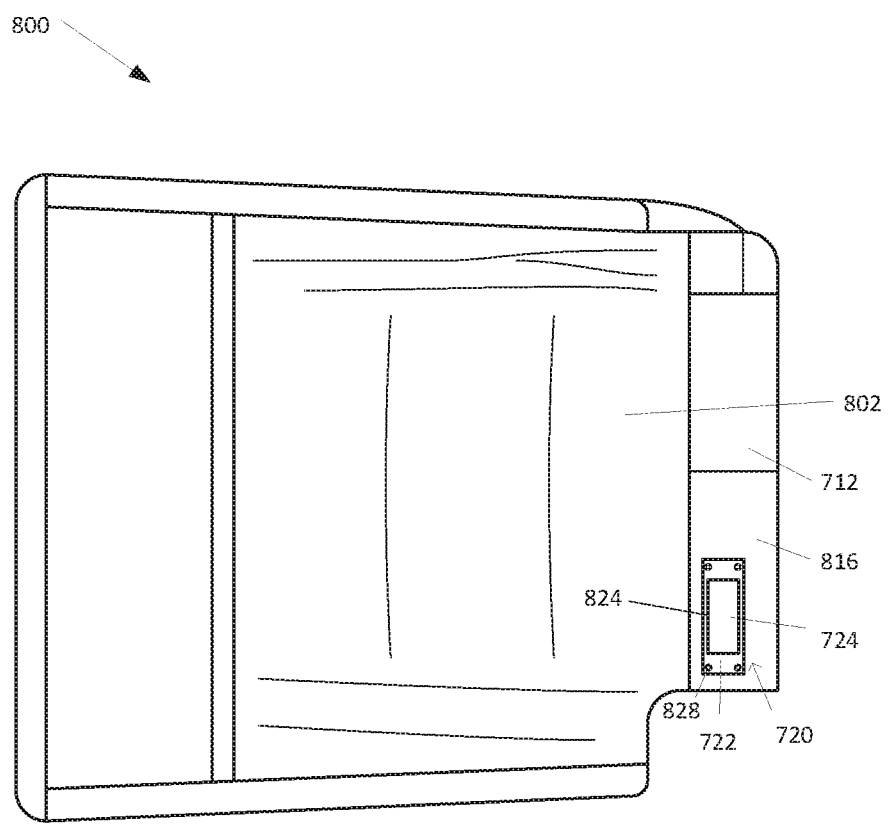
FIG. 8 illustrates a side view of a thrust reverser having a pressure relief arrangement in accordance with various embodiments of the disclosure.

Referring to FIG. 8, a side view of a thrust reverser having a pressure relief arrangement 720 is illustrated according to various embodiments. The thrust reverser may comprise a translating sleeve 802, an IFS 712, and a pressure relief arrangement 720. The pressure relief arrangement 720 may be located on an engine bottom portion 816 of the IFS 712 to allow the pressure relief arrangement to release a greater volume of fluid in a high pressure scenario, e.g., a burst duct scenario. The pressure relief arrangement 720 may be located aft of the translating sleeve 802. This will ensure that upon use, the pressure relief arrangement 720 will open to ambient air. Additionally, when the pressure relief arrangement 720 is on the engine bottom portion 816 of the IFS 712, the pressure relief arrangement 720 would remain open after an event, which would provide an indication that an event occurred based on visual inspection after an aircraft lands. Further, the pressure relief mechanism may comprise a pressure relief door 724 and a relief hinge 824, about which the pressure relief door 724 opens when the pressure relief arrangement 720 is in use. The relief hinge 824 may be located at the forward edge of the pressure relief door 724 in order to ensure the pressure relief door 724 remains open after use. The relief hinge 824 may couple the pressure relief door 724 to the frame 722 of the pressure relief arrangement 720. The frame 722 may be coupled to the IFS 712 of the thrust reverser via mounting apertures 828. Any mounting method known in the art may be utilized. For example, the frame 722 may be mounted to the IFS 712 by rivets, composite locks, screws, or any other fastening method known in the art. Alternatively, the frame 722 may be welded, soldered, or brazed to the IFS 712 without the use of mounting apertures.

Figure 9:
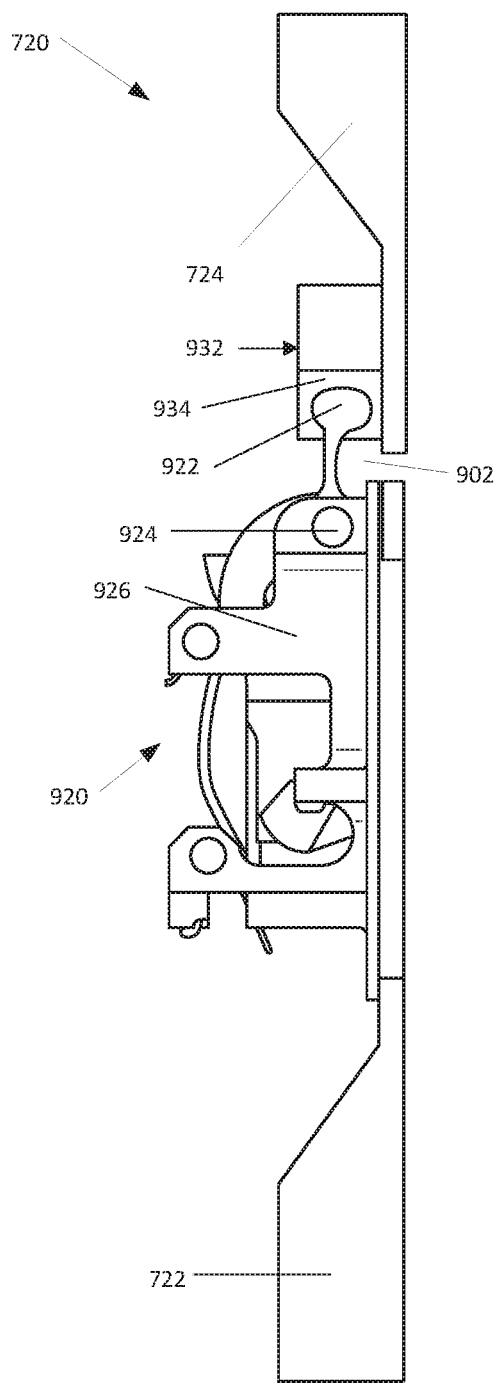
FIG. 9 illustrates a pressure relief arrangement in accordance with various embodiments.

Referring to FIG. 9, a pressure relief arrangement 720 is illustrated according to various embodiments. The pressure relief arrangement 720 may comprise a frame 722, a latch mechanism 920 coupled to the frame 722, and a pressure relief door 724 comprising a bracket 932. The latch mechanism 920 may comprise a latch housing 926, a pressure relief latch 922 and a fulcrum 924 about which the pressure relief latch 922 pivots. The latch mechanism 920 may be coupled to the pressure relief door 724 by engaging the pressure relief latch 922 to the bracket 932, fixing the pressure relief door 724 in place. The bracket 932 may comprise a keeper 934 designed to fix the pressure relief latch 922 in place during normal operation. The pressure relief door may be coupled to the frame 722 at a hinge located opposite the bracket 932, as shown in FIG. 8. The pressure relief door 724 and the frame 722 may be separated by a gap 902, where the latch mechanism 920 couples the frame 722 to the pressure relief door 724. In various embodiments, the gap 902 may be sealed during normal operation. By placing the bracket 932 on the pressure relief door 724, as opposed to placing the latch mechanism 920 on the pressure relief door, the mass moment of inertia of the pressure relief door 724 may be significantly reduced. This configuration results in a pressure relief door 930 that is able to open more rapidly, relieving pressure faster, resulting in limited peak pressure during the burst duct event.

Figure 10:
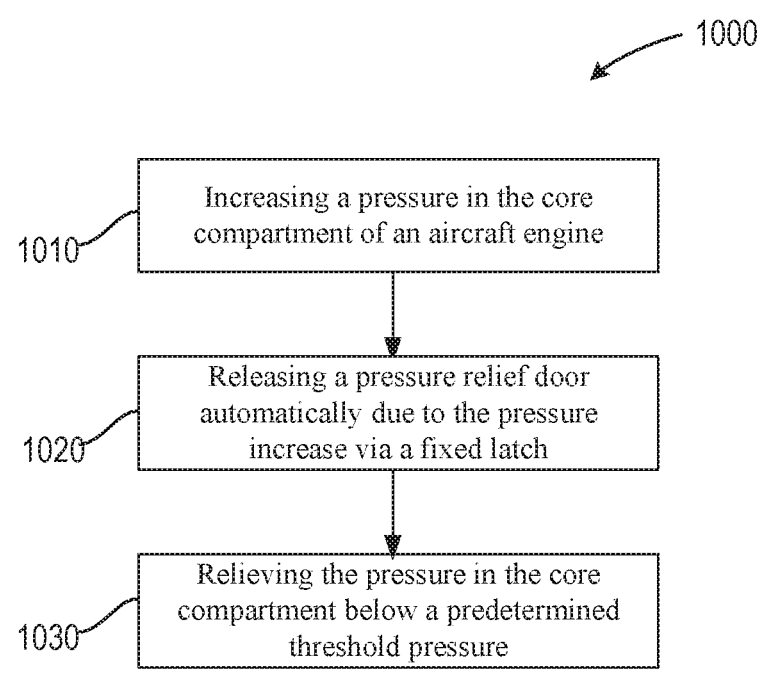
FIG. 10 illustrates a method of use of nacelle pressure relief in accordance with various embodiments.

Referring to FIG. 10, a method of use of relieving pressure in a core compartment of an aircraft engine 1000 is illustrated according to various embodiments. The first step, block 1010, of relieving pressure in a core compartment comprises increasing a pressure in the core compartment of an aircraft engine. This may occur during a high pressure engine scenario, and the intent is to prevent a duct in the engine from bursting due to the high pressure scenario. Without a pressure relief arrangement, the IFS of a thrust reverser would need to be significantly stiffer to handle the structural loads of the pressure increase. The second step, block 1020, is to release a pressure relief door coupled to a thrust reverser via a fixed latch and a hinge. Both the pressure relief door and the fixed latch may release radially outward of the thrust reverser, as shown in FIG. 6B. The increased pressure is exerted on the latch that is fixed to the IFS as well as the pressure relief door. The fixed latch may release the bracket that is coupled to the pressure relief door that results in an opening for a pressurized fluid, such as air, to escape. Referring back to FIG. 6B, this method may result in the pressure relief door 630 pivoting away from the fixed latch. The third step, block 1030, of relieving pressure in a core compartment may comprise reducing the pressure in the core compartment below the predetermined threshold pressure. The pressure relief door may be coupled to the thrust reverser by a non-biased hinge, so that the pressure relief door may remain open after an event. This may permit the pressure in the core compartment to be reduced below the predetermined threshold pressure. The pressure in the core compartment will eventually reach a steady state pressure below the predetermined threshold pressure and alleviating any potential structural damage to the aircraft engine.

Figure 11:
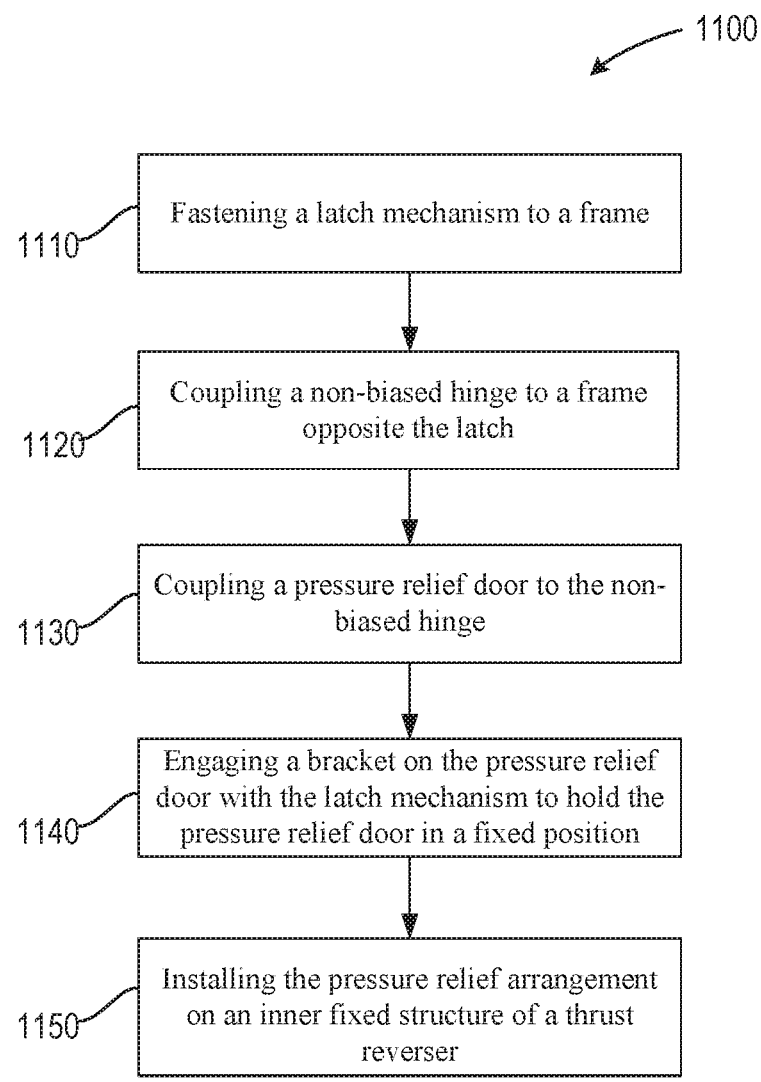
FIG. 11 illustrates a method of manufacture of a pressure relief arrangement installable on a thrust reverser in accordance with various embodiments.

Referring to FIG. 11, a method of manufacturing a pressure relief arrangement installable on a thrust reverser of a nacelle 1100 is illustrated according to various embodiments. The first step, block 1110 may comprise fastening a latch mechanism to a frame. The frame may comprise an aperture configured to receive a pressure relief door. The latch mechanism may be placed along one side of the perimeter and hang over the edge of the aperture after block 1110. The second step, block 1120 may comprise coupling a non-biased hinge to the frame at a side location along the perimeter of the aperture and opposite the latch. The non-biased hinge and the latch mechanism may be fastened to frame by rivets, bolts, screws, or similar fastening methods known in the art.

The third step, block 1130, may comprise coupling a pressure relief door to the non-biased hinge. The pressure relief door may comprise a bracket opposite the hinge attachment location. The fourth step, block 1140, may comprise engaging the bracket coupled to the pressure relief door with the latch mechanism from block 1110. Once engaged, the latch mechanism may hold the pressure relief door in place. The latch mechanism and bracket may be configured to release once the pressure relief door exceeds a specific pressure. After block 1140, the result may be a pressure relief arrangement that may installable on various components. The fifth step, block 1150, may comprising installing the pressure relief arrangement on an inner fixed structure of a thrust reverser. The pressure relief arrangement may be installed by rivets, bolts, screws, or similar fastening methods. The pressure relief arrangement may be installed aft of the translating sleeve to ensure any escaping fluid releases to ambient air. The pressure relief assembly may be installed on engine bottom to provide maintenance with an indication if the pressure relief arrangement was used during a previous flight.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A nacelle comprising:
   an inner fixed structure;
   a pressure relief assembly comprising:
   a latch mechanism comprising a pressure relief latch pivotably coupled to the inner fixed structure;
   a first hinge coupled to the inner fixed structure;
   a pressure relief door coupled to and configured to pivot about the first hinge, the pressure relief door comprising a bracket, the pressure relief latch configured to hold the pressure relief door in a closed position, the bracket directly coupled to the pressure relief door, the pressure relief latch releasably coupled to the bracket, wherein:
   the pressure relief latch is configured to automatically release from the bracket and pivot radially outward about a hinge line defined by a second hinge in response to a pressure difference across the pressure relief door, the first hinge is coupled to the inner fixed structure proximate a first end of the pressure relief door, and the pressure relief latch is coupled to the inner fixed structure proximate a second end of the pressure relief door, the second end opposite the first end.

2. The nacelle of claim 1, wherein the pressure relief assembly is located on a bottom portion of the inner fixed structure.

3. The nacelle of claim 1, further comprising a fan exit plane defined by a translating sleeve, wherein the pressure relief assembly is located aft of the fan exit plane.

4. The nacelle of claim 1, wherein the latch mechanism has a latch mechanism weight and the bracket has a bracket weight, wherein the bracket weight is less than the latch mechanism weight.

5. The nacelle of claim 1, wherein the inner fixed structure is configured to be mounted to a thrust reverser of the nacelle.

\* \* \* \* \*